US006822687B1

(12) United States Patent
Kakiuchi et al.

(10) Patent No.: US 6,822,687 B1
(45) Date of Patent: Nov. 23, 2004

(54) THREE-DIMENSIONAL IMAGE CAPTURING DEVICE AND ITS LASER EMITTING DEVICE

(75) Inventors: Shinichi Kakiuchi, Saitama (JP); Shuzo Seo, Saitama (JP); Nobuhiro Tani, Tokyo (JP)

(73) Assignee: PENTAX Corporation, Tokyo (JP)

( * ) Notice: Subject to any disclaimer, the term of this patent is extended or adjusted under 35 U.S.C. 154(b) by 644 days.

(21) Appl. No.: 09/612,499

(22) Filed: Jul. 7, 2000

(30) Foreign Application Priority Data

| Jul. 8, 1999 | (JP) | P11-194253 |
| Jul. 13, 1999 | (JP) | P11-198516 |
| Jul. 13, 1999 | (JP) | P11-198741 |

(51) Int. Cl.[7] ............ G03B 13/00; G03B 15/03; H04N 5/225; G01C 3/08
(52) U.S. Cl. ............ 348/348; 348/207.99; 396/109; 356/4.01
(58) Field of Search ............ 348/207.99, 348, 348/345, 370; 396/109; 356/4.01–4.07, 3.1

(56) References Cited

U.S. PATENT DOCUMENTS

| 4,621,292 A | * | 11/1986 | Hirao et al. ........... 348/348 |
| 4,686,572 A | | 8/1987 | Takatsu |
| 4,894,677 A | * | 1/1990 | Bourcier et al. ....... 348/348 |
| 5,081,530 A | * | 1/1992 | Medina ................. 348/371 |
| 5,125,735 A | * | 6/1992 | Oizumi et al. ......... 356/3.04 |
| 5,694,203 A | * | 12/1997 | Ogawa ................. 348/348 |
| 5,701,015 A | * | 12/1997 | Lungershausen et al. ... 396/109 |
| 6,057,909 A | * | 5/2000 | Yahav et al. ........... 356/5.04 |
| 6,373,557 B1 | * | 4/2002 | Mengel et al. ......... 356/4.07 |
| 6,628,335 B1 | * | 9/2003 | Numazaki et al. ...... 348/370 |
| 6,721,007 B1 | * | 4/2004 | Tani et al. ............ 348/348 |

FOREIGN PATENT DOCUMENTS

JP          4-351074          12/1992

OTHER PUBLICATIONS

"Measurement Science and Technology", by S. Christie et al., vol. 6, pp. 1301–1308, published by IOP Publishing Ltd., 1995.

* cited by examiner

Primary Examiner—Andrew Christensen
Assistant Examiner—Nhan Tran
(74) Attorney, Agent, or Firm—Greenblum & Bernstein, P.L.C.

(57) ABSTRACT

A three-dimensional image capturing device comprises a plurality of laser devices, and an imaging device, such as a CCD, having a plurality of photo-diodes. Each of the laser devices radiates a pulse modulated laser beam so as to detect distance information or data relating to a topography of a measurement subject. The laser beam is radiated onto the measurement subject and a reflected light beam is sensed by the CCD. Signal charge corresponding to a distance from the image capturing device to the measurement subject is accumulated in each of the photo-diodes, and thus the above distance information is sensed. Each laser beam, respectively radiated from each of the laser devices, shares illuminating area at the distance of the measurement subject, so that radiant energy of each laser beam can be reduced by sharing a single distance measurement operation among the plurality of laser devices.

9 Claims, 15 Drawing Sheets

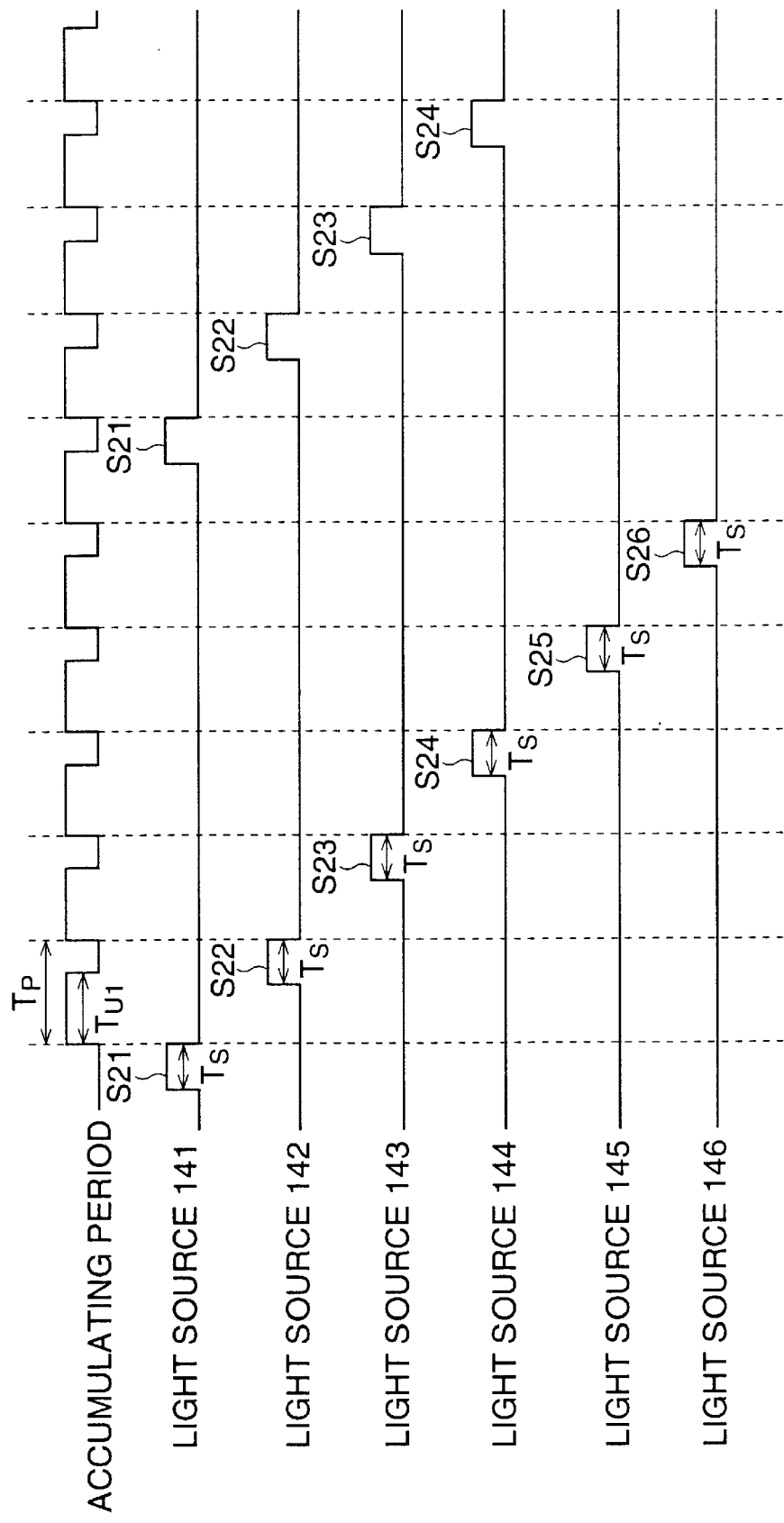

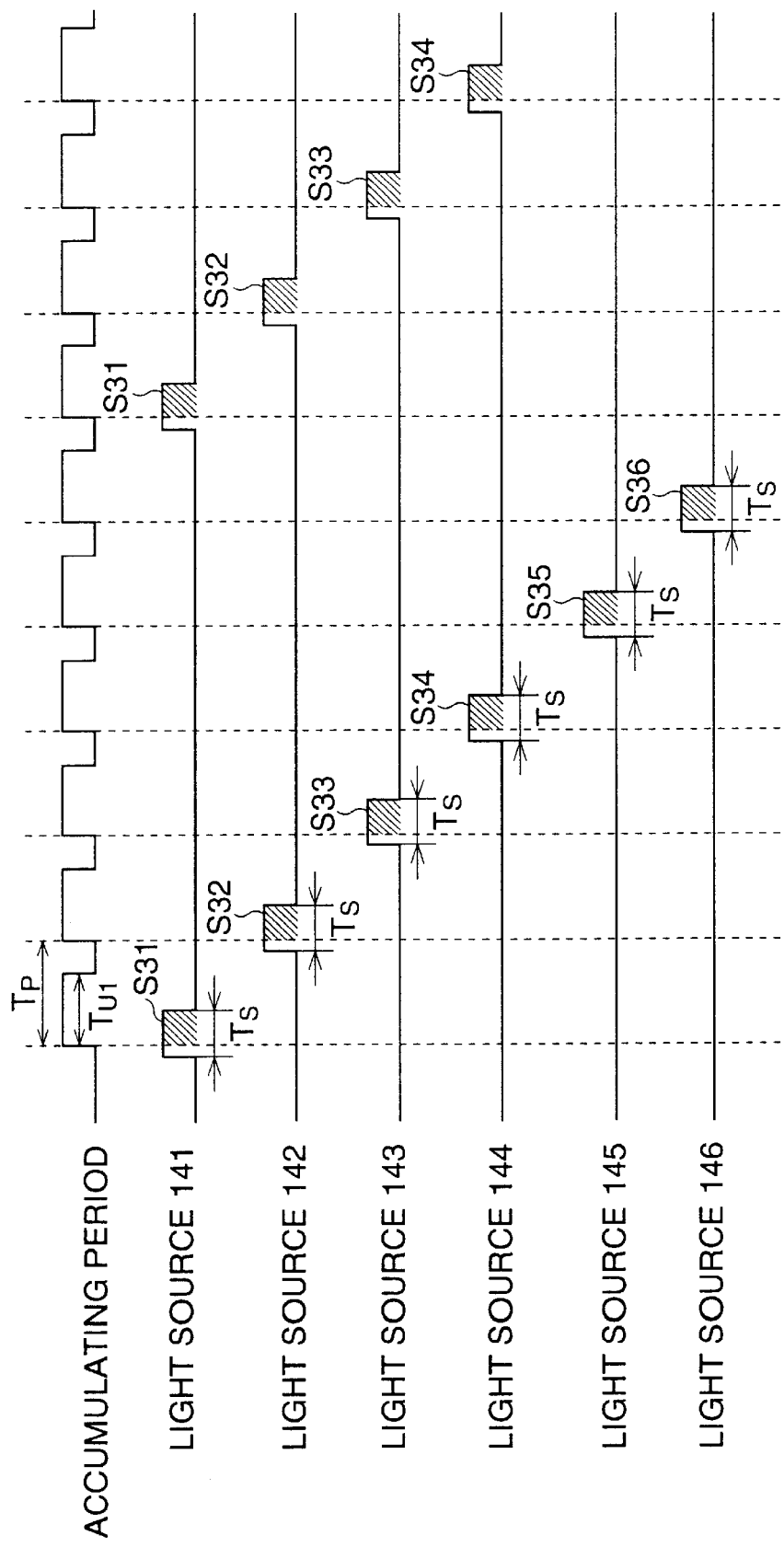

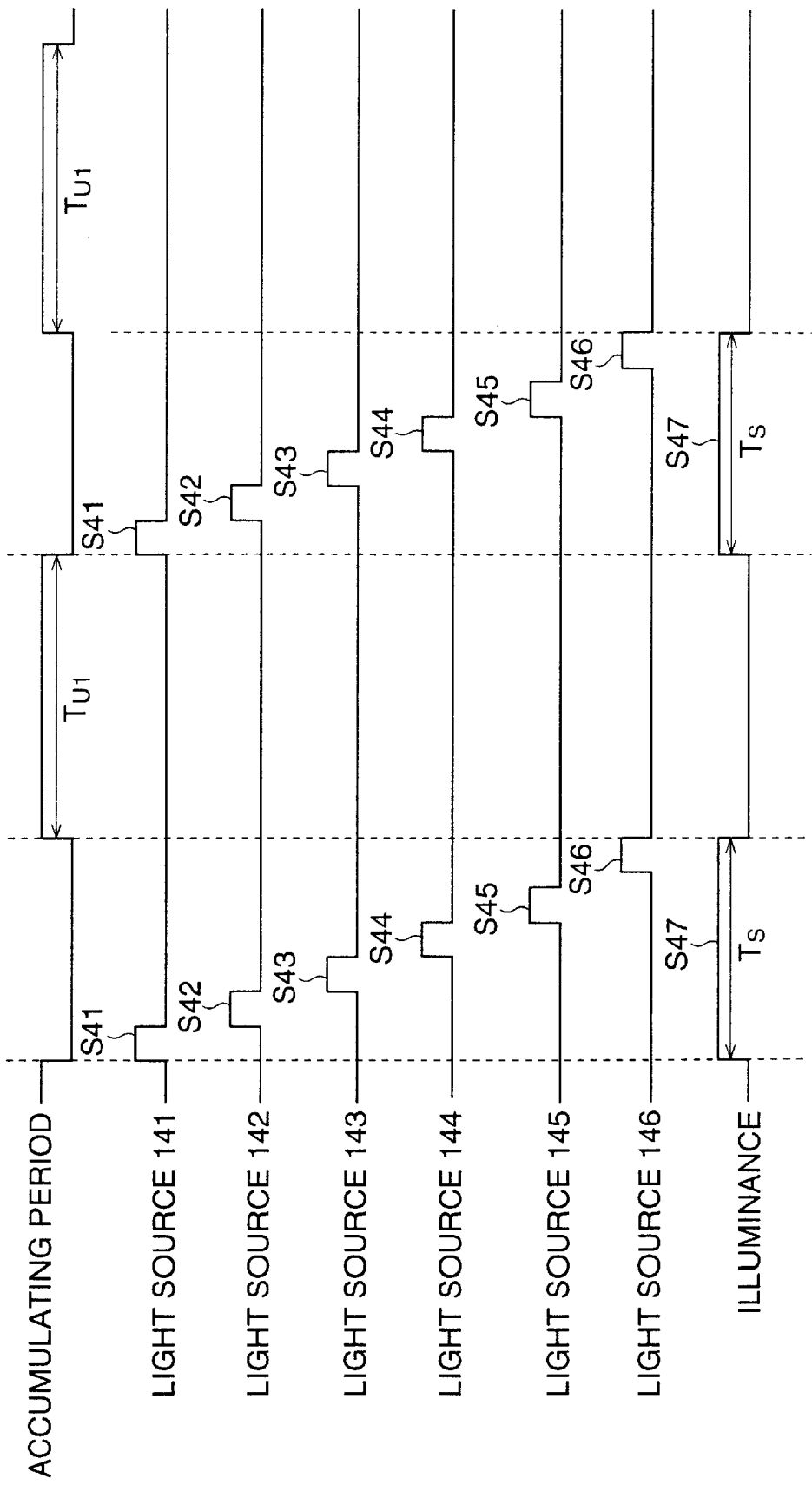

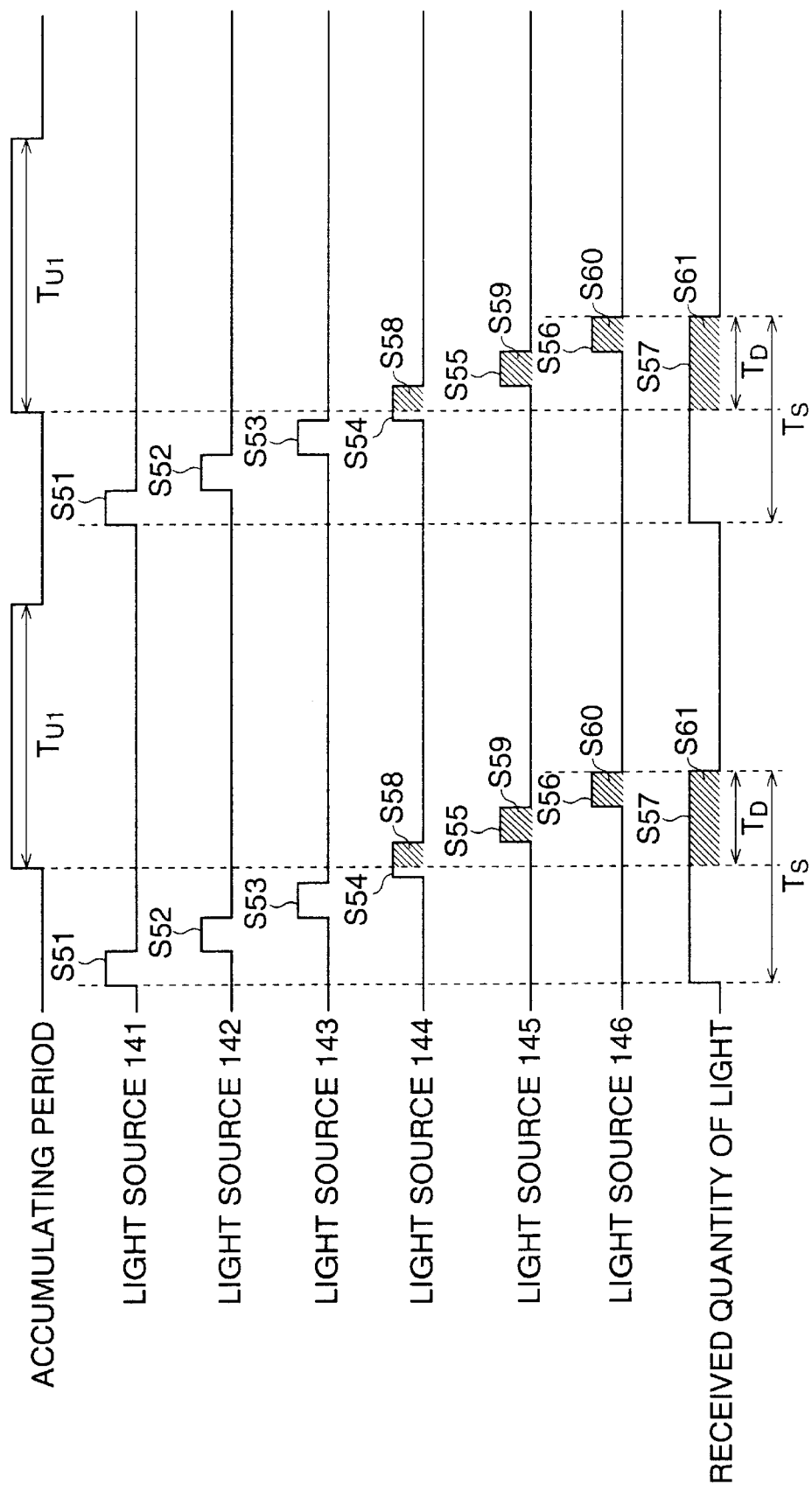

THREE-DIMENSIONAL IMAGE CAPTURING DEVICE AND ITS LASER EMITTING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement and its laser for emitting a measurement light beam.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, a moiré topography, and so on, and the passive system comprises a stereo vision system, and so on.

An active system device is bulky in comparison with that of the passive system, since the device requires a laser beam output mechanism. However, the active system device is superior regarding a distance measurement resolution, a measuring time, a measuring range and so on, and thus, despite the bulkiness, the device is utilized in various fields. In a three-dimensional image capturing device, described in "Measurement Science and Technology" (S. Christies et al., vol.6, p.1301–1308, 1995), a pulse-modulated laser beam irradiates a whole of a measurement subject through an illumination lens, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

However, if a person is standing nearby the measurement subject and is in the range of the divergent laser illumination, a laser beam may become incident on an eye of the person and may damage the retina. Therefore, three-dimensional measurement using laser beam may be harmful to the retina of a bystander during the measurement.

SUMMARY OF THE INVENTION

An object of the present invention is to provide a three-dimensional image capturing device and its laser emitting device which emits a laser beam onto a measurement subject to detect three-dimensional distance information of the subject without causing retina damage to an eye of a bystander.

According to the present invention, there is provided a laser emitting device applied in a three-dimensional image capturing device, comprising a plurality of laser devices and a laser emitting operating processor.

The plurality of laser devices radiates pulse modulated laser beams irradiating a measurement subject for a distance measurement, and the plurality of laser devices is separated into predetermined groups. The laser emitting operating processor controls the laser devices to radiate laser beams concurrently in a group. Each of the laser devices in each group is disposed at predetermined intervals. Further, each illuminating area of the laser beam radiated from each laser device overlaps each other at the distance of the measurement subject.

In a preferable example of the laser emitting device, the plurality of laser devices is disposed at regular intervals along a periphery of a photographing lens in a circular arrangement. In another preferable example, a plurality of laser devices is arranged at regular intervals along a line in a predetermined direction.

Further, according to the present invention, there is provided a three-dimensional image capturing device, comprising a plurality of laser devices, an imaging device, a signal charge accumulation control processor, a signal charge accumulation control processor, a signal charge integrating processor and a laser emitting operating processor.

The plurality of laser devices radiates pulse modulated laser beams irradiating a measurement subject for a distance measurement, and the plurality of laser devices is separated into predetermined groups. The imaging device accumulates signal charge corresponding to a quantity of light received at the imaging device. The signal charge accumulation control processor controls an accumulating operation of signal charge generated in the imaging device due to a reflected light beam of the laser beam, which is reflected by the measurement subject. The signal charge integrating processor drives the signal charge accumulation control processor repeatedly, so that the signal charge accumulated in the imaging device is integrated. The laser emitting operating processor controls the laser devices, which radiate laser beams concurrently in said group. Each of the laser devices in each group is disposed at predetermined intervals. Further, each illuminating area of the laser beam radiated from each laser device overlaps each other at the distance of the measurement subject.

Further, according to another aspect of the present invention, there is provided a three-dimensional image capturing device, comprising a plurality of laser devices, an imaging device and a laser radiating control processor.

The plurality of laser devices radiates pulse modulated laser beams for a distance measurement in order to detect distance information related to the topography of a measurement subject. The imaging device accumulates signal charge corresponding to a quantity of light received at the imaging device. The laser radiating control processor controls the plurality of laser devices to radiate the laser beams in a predetermined order. Further, each of the laser devices is disposed at predetermined intervals and each illuminating area of said laser beam radiated from each laser device overlaps each other at the distance of the measurement subject.

Preferably, the device further comprises a signal charge accumulation control processor and a signal charge integrating processor. The signal charge accumulation control processor controls an accumulating operation of signal charge generated in the imaging device due to a reflected light beam of the laser beam, which is reflected by the measurement subject. The signal charge integrating processor drives the signal charge accumulation control processor repeatedly, so that the signal charge accumulated in the imaging device is integrated. The laser radiating control processor controls the plurality of laser devices to radiate the reflected light beams successively and alternately, so that each of said laser beams may be received respectively in each of accumulating operations executed in the signal charge integrating processor.

Further, the imaging device preferably comprises a plurality of photoelectric conversion elements and a signal charge holding unit. The plurality of photoelectric conversion elements accumulates the signal charge in each of the photoelectric conversion elements, and the signal charge holding unit is disposed adjacent to each of the photoelectric conversion elements. So that, the signal charge accumulated in each of the photoelectric charge conversion elements is transferred to each of said accumulating operations executed in the signal charge integrating processor.

Furthermore, the plurality of laser devices may be disposed at regular intervals along a periphery of a photographing lens in a circular arrangement, and the laser radiating control processor controls each of the laser devices so as to radiate the laser beams from each of the laser devices successively around the circular arrangement. Alternatively, the plurality of laser devices may be arranged at regular intervals along a line in a predetermined direction and the laser devices repeatedly radiate the laser beams successively along the line.

In another preferable example of the three-dimensional image capturing device, the laser radiating control processor controls the plurality of laser devices to radiate the laser beams in a predetermined order consecutively, so that the consecutive laser beams compose a single pulse beam for the distance measurement, and preferably, the single pulse beam comprises a rectangular pulse.

In this example, the laser beams may be radiated from the plurality of laser devices successively along the arrangement so as to compose the single pulse beam. The imaging device receives a reflected light beam of the single pulse beam, and detects the distance information, which relates to the measurement subject, from signal charge accumulated in the imaging device, due to the single pulse beam, during a predetermined period.

Further, the laser radiating control processor is driven repeatedly and the imaging device respectively accumulates the signal charge in each of the predetermined periods that corresponds to each of said single pulse beams. Moreover, if the imaging device is comprised of the plurality of photoelectric conversion elements and the signal charge holding unit, the signal charge accumulated in each of the photoelectric conversion elements may be transferred to each of the corresponding signal charge holding units for each of the predetermined periods.

BRIEF DESCRIPTION OF THE DRAWINGS

The objects and advantages of the present invention will be better understood from the following description, with reference to the accompanying drawings in which:

FIG. 15 is a timing chart of a laser emitting operation for each light source in the third and fourth embodiments;

FIG. 16 is a timing chart of a signal charge accumulating operation in the third and fourth embodiments;

FIGS. 17 is a timing chart of a laser emitting operation for each light source in the fifth and sixth embodiments;

FIG. 18 is a timing chart of a signal charge accumulating operation in the fifth and sixth embodiments.

DESCRIPTION OF THE PREFERRED EMBODIMENTS

Figure 1:
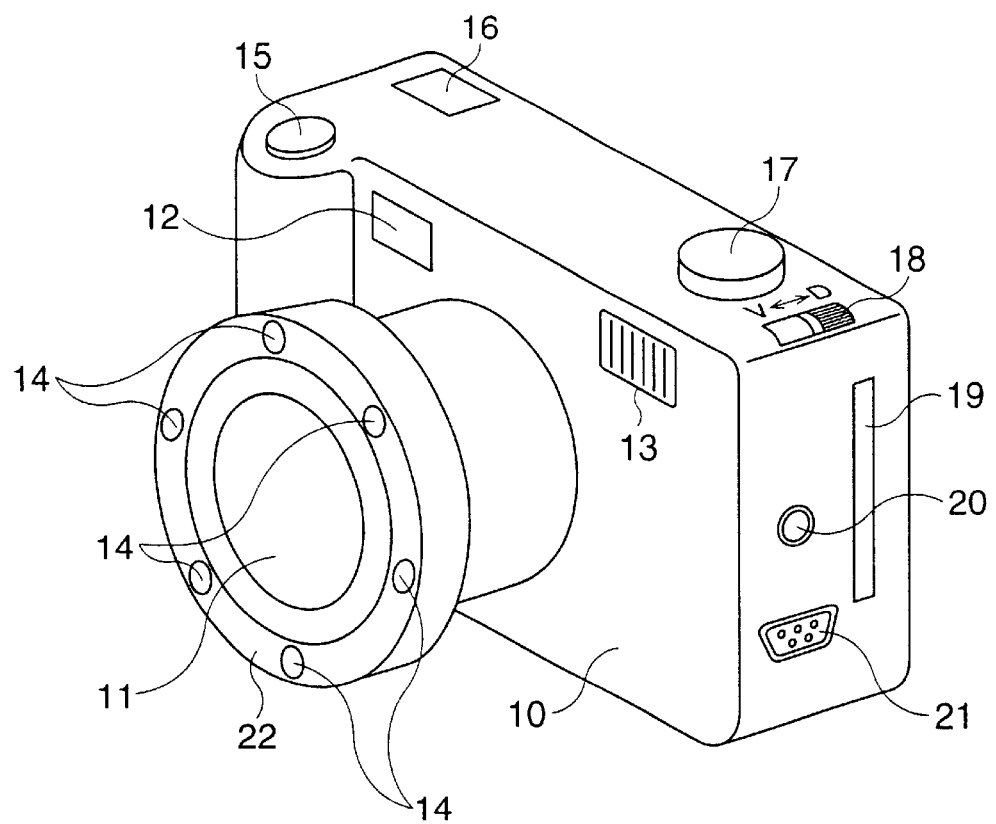
FIG. 1 is a perspective view showing a camera provided with a three-dimensional image capturing device of a first, a third and a fifth embodiment of the present invention.

The present invention is described below with reference to embodiments shown in the drawings.

FIG. 1 is an external view of an optical reader of a first embodiment of the present invention.

On a front surface of a camera body 10, a view-finder window 12 is provided toward a left-upper edge, adjacent to a photographing lens 11 and an electronic flash 13 is disposed toward a right-upper edge. On a periphery of the photographing lens 11 or a lens mount, a ring shaped laser emitting device 22 is disposed. There are six laser devices (light sources) 14 disposed on a front surface of the laser emitting device 22, and arranged at regular intervals around the ring. On a left side of an upper surface of the camera body 10, a release switch 15 and a liquid crystal display panel 16 are provided, and a mode change dial 17 and a V/D mode switch 18 are provided on a right side of the surface. On a side surface of the camera body 10, a card slot 19 is formed, into which a recording medium, such as an IC memory card, is insertable, and a video output terminal 20 and an interface connector 21 are also provided.

Figure 2:
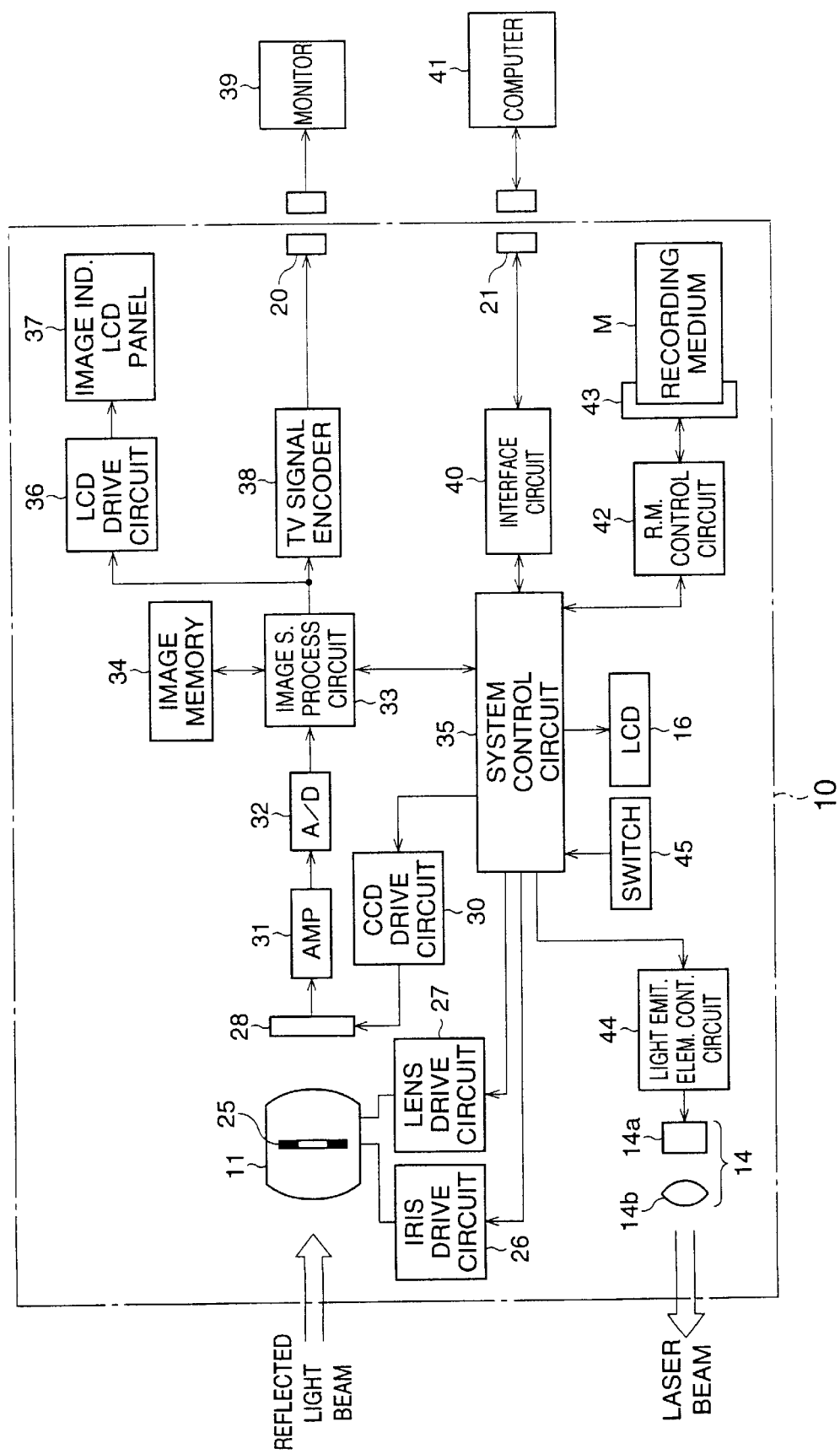
FIG. 2 is a block diagram showing an electrical construction of the camera in the present embodiments.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A light emitting element control circuit 44 is connected to the system control circuit 35. Each of the laser devices 14 is provided with a light emitting element or a laser diode (LD) 14a and an illumination lens 14b, and an operation of the light emitting element 14a is controlled by the light emitting element control circuit 44. The light emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later.

The liquid crystal display panel 16 and a switch group 45, including the release switch 15, the mode change dial 17 and the V/D mode switch 18, are connected to the system control circuit 35.

Figure 3:
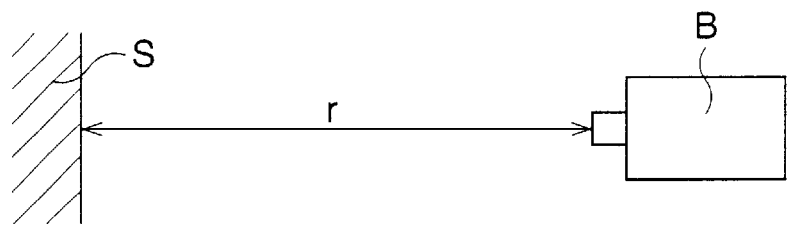
FIG. 3 is a view showing a principle behind a distance measurement.
Figure 4:
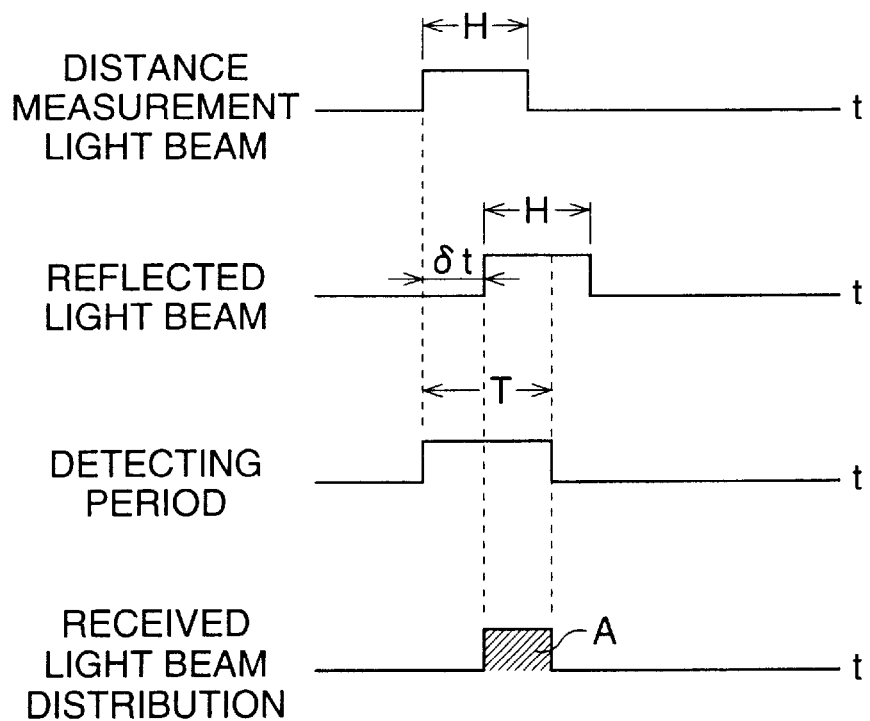
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time σ·t (σ is a delay coefficient). Since the distance measuring light beam and the reflected light beam have both traveled a distance "r" between the distance measurement device B and the measured subject S, the distance "r" is represented as follows:

$$r = \sigma \cdot t \cdot C / 2 \ldots \quad (1)$$

wherein "C" is the speed of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time σ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
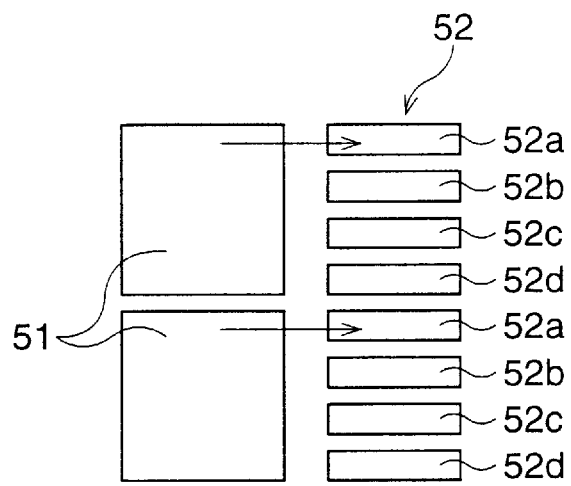
FIG. 5 is a plan view showing a disposition of photodiodes and a vertical transfer unit, which are provided n the CCD.
Figure 6:
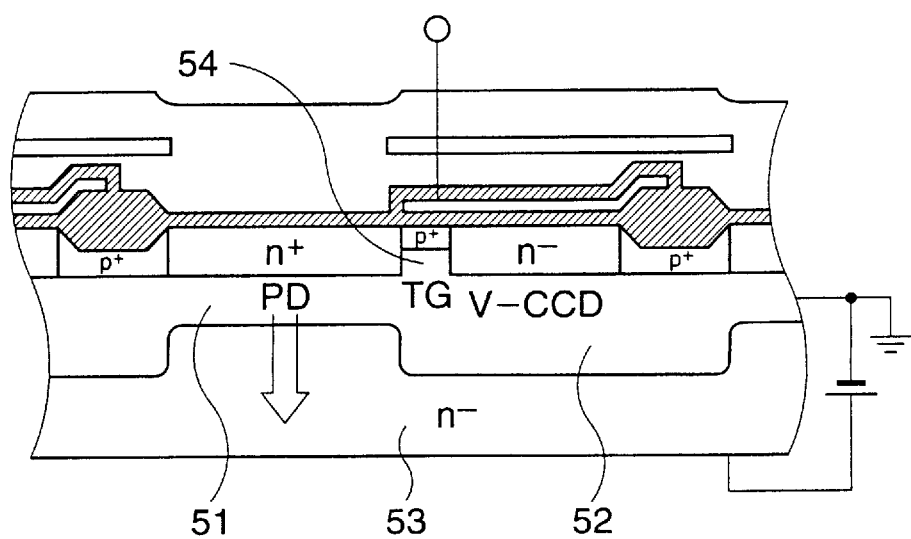
FIG. 6 is a sectioned elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 7:
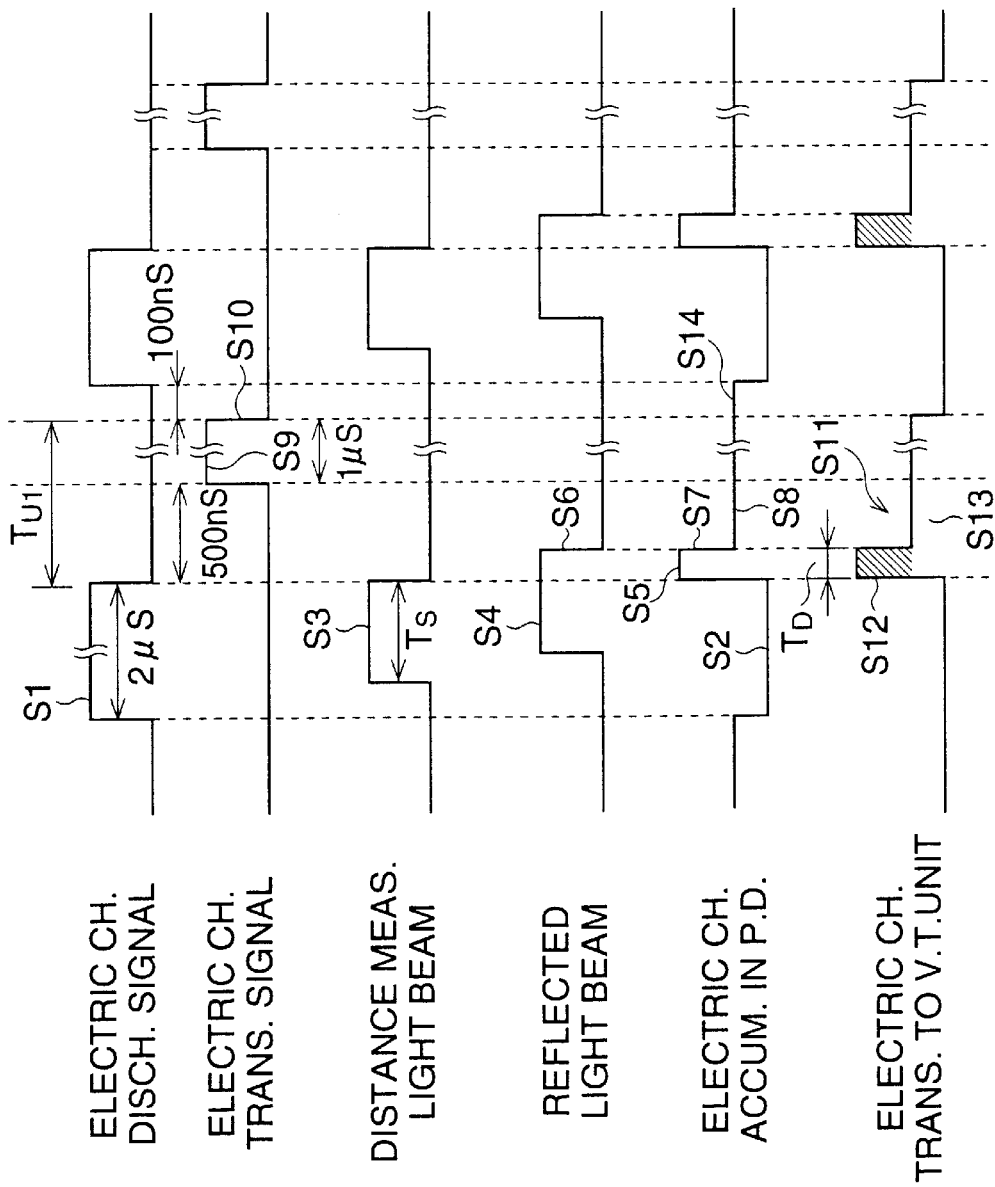
FIG. 7 is a timing chart of a distance information sensing operation by which data, corresponding to a distance from a camera body to each point on a surface of the measurement subject, is sensed.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7. Note that the timing chart of the distance information sensing operation in the present embodiment is slightly different from the timing chart of the distance measurement principle, which was described above with reference to FIG. 4. Namely, the timing chart of the present embodiment is set so as to sense the reflected light beam from a point subsequent to the rise of the reflected light beam pulse to a point subsequent to the fall. By this manner, a noise component due to an ambient daylight may be reduced, though the principles of the above distance measurement means are basically the same.

In synchronization with an output of a vertical synchronizing signal (not shown), an electric charge discharging signal (a pulse signal) S1 is output, so that unwanted charge, which is accumulated in the photo-diodes 51, is discharged to the substrate 53. The electric charge value, while the pulse signal S1 is output, is indicated as S2 in the chart. After the electric charged is charging signal S1 is output, the laser emitting device 22 is actuated, and thus a distance measuring light beam S3, which is a pulsed beam having a constant width $T_S$, is output therefrom. A period for outputting the distance measuring light beam S3 or the width of the pulse beam is modulated according to a requirement. In the present embodiment, the distance measuring light beam S3 is modulated as to be completed approximately simultaneously with a completion of the output of the electric charge discharging signal S1.

The distance measuring light beam S3 is reflected by the measurement subject, and enters the CCD 28 as a reflected light beam S4. When the output of the electric charge discharging signal S1 ends, the electric charge for incident light, which comprises the reflected light beam S4 and an ambient daylight, starts on each of the photo-diodes and a signal charge S5 is generated. When an incident of the reflected light beam S4 is completed, i.e. after the fall indicated with a reference sign S6, the photo-diodes only generate signal charge S8 due to the ambient daylight.

An electric charge transfer signal (pulse signal) S9 is output and an electric charge accumulated in the photo-diodes 51 is transferred to the vertical transfer unit 52. The operation of transferring the accumulated electric charge in the photo-diodes 51 ends with the fall S10, which is a termination of the output of the electric charge transfer signal S9. Namely, a signal charge S11 of which electric signal accumulation was started just after the completion of the electric charge discharging signal output and terminated just after the completion of the output of the electric transfer signal S9, is transferred to the vertical transfer unit 52, while the photo-diodes continue to accumulate electric signals S14 due to the ambient daylight.

Thus during a period $T_{U1}$ from the end of the output of the electric charge discharging signal S1 to the end of the output of the electric charge transfer signal S9, a signal charge S11, corresponding to distances from the camera body to the measurement subject and the ambient daylight is accumulated in the photo-diodes 51. Namely, the signal charge S12, a hatched portion of signal charge S11, corresponds to the distances from the camera body 10 to the measurement subject, while a residual portion S13 of the signal charge S11 results from the ambient daylight.

When a predetermined time has elapsed since the output of the electric charge transfer signal S9, a subsequent electric charge discharge signal is output, so that the signal charge S14, an electric charge accumulated in the photo-diodes 51 after the signal charge transfer to the vertical transfer unit 52, is discharged to the substrate 53. Subsequently, another signal charge is accumulated in the photo-diodes 51. Then, similarly to the above description, when the electric charge accumulation period $T_{U1}$ has again elapsed, the signal charge S11 is transferred to the vertical transfer unit 52.

The transferring operation of the signal charge S11 to the vertical transfer unit 52 is repeatedly performed until the next vertical synchronizing signal (not shown) is output. Thus, the signal charge S11 is integrated in the vertical transfer unit 52. The signal charge S11 integrated for one field period, which is between two vertical synchronizing signals, comprises not only a signal charge S12 corresponding to distance information of the measurement subject but a signal charge S13 due to the ambient daylight. However, since the signal charge S13 is negligible as compared with the signal charge S12, the signal charge S11 can be regarded to correspond to the distance information of the subject, on condition that the measurement subject is stationary for the period between the two vertical synchronizing signals. Therefore, when the relations between a period $T_D$, the width of the pulse S5 which correspond to a detected period of reflected light beam S4, and the signal charge S11 are known, a distance "r" that is from the camera body to the measurement subject is calculated from the signal charge S11, since the period $T_D$ corresponds to an amount of σ·t in the equation The detecting operation of the signal charge S11 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the CCD 28, as a three-dimensional image data of the measured subject.

Figure 8:
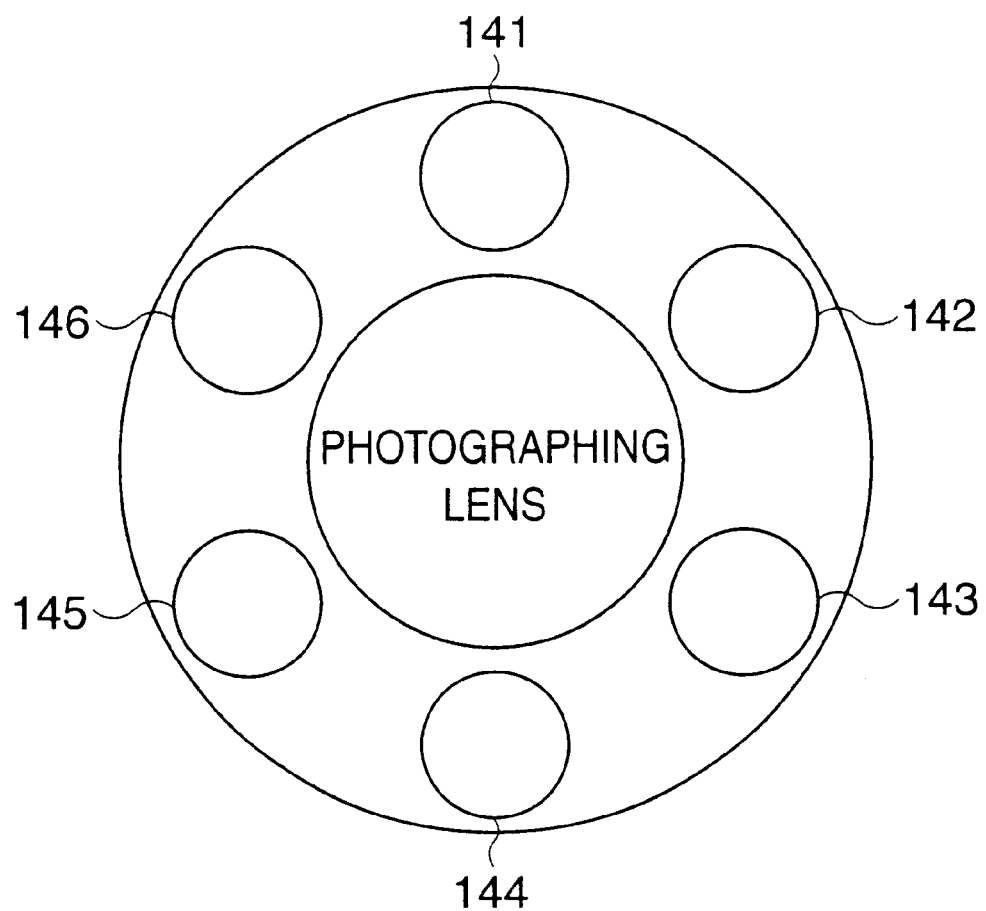
FIG. 8 illustrates a disposition of the light sources on a laser emitting device in the first, third and fifth embodiments.
Figure 9:
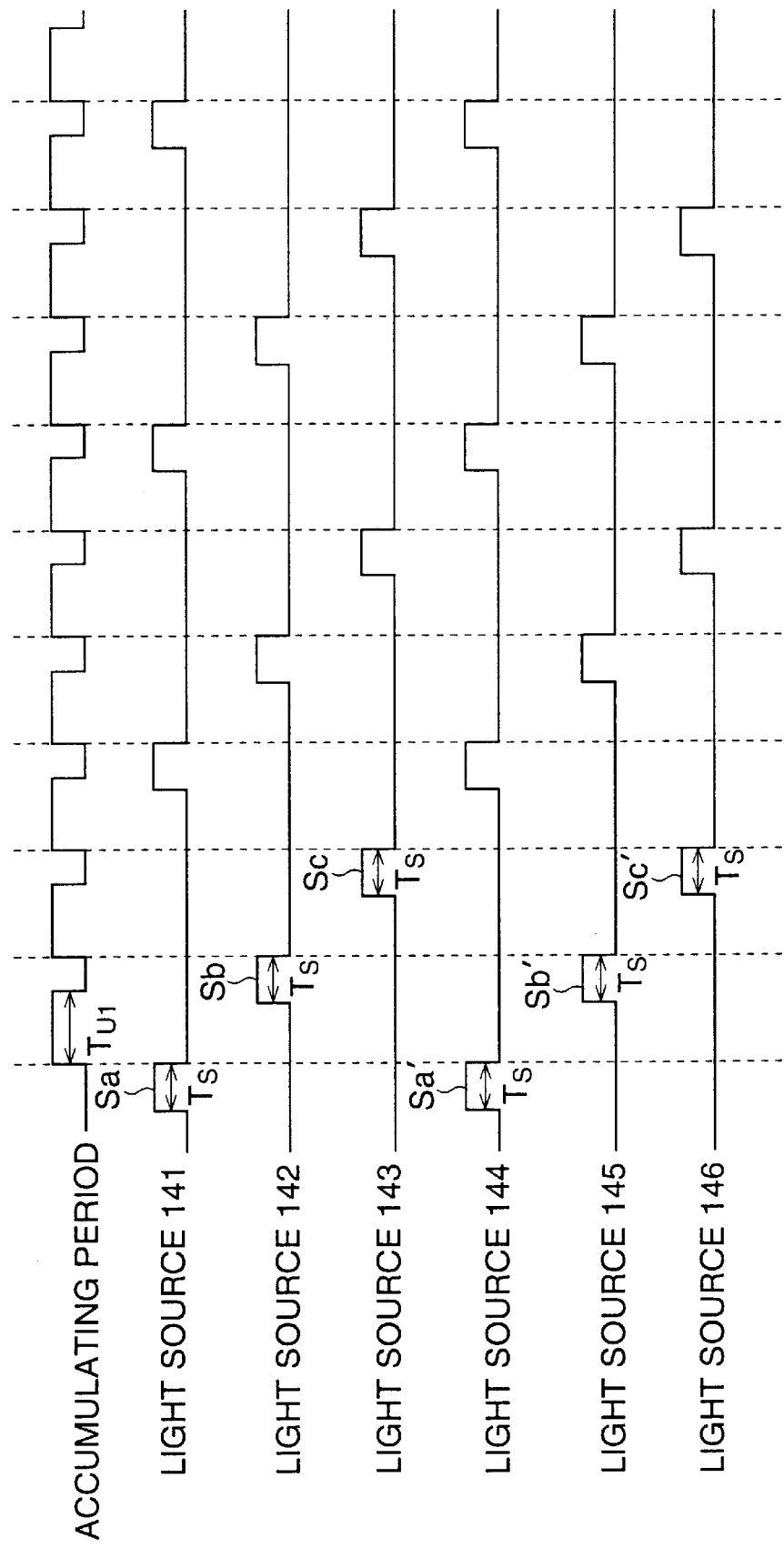
FIG. 9 is a timing chart of a laser emitting operation for each light source in the first and second embodiments.

With reference to FIG. 8 and FIG. 9, timing of laser emissions from the six laser devices 14 is described.

FIG. 8 illustrates a front view of the ring shaped laser emitting device 22. Each of the light sources 14, arranged around the ring at regular intervals, is indicated with reference numbers 141 through 146, respectively. A numbering of the light sources starts from the light source at 12 o'clock, and succeeds in a clockwise direction. Each pair of the light sources 141 and 144, 142 and 145, 143 and 146 is disposed symmetrically with respect to the center of the ring or photographing lens. FIG. 9 is a timing chart that shows the timing of the accumulating period $T_{U1}$ and a pulse modulated distance measuring light beam emission, which is radiated from the above six light sources.

In a light or laser emitting operation of the light sources 141 through 146, laser pulse beams (distance measuring light beams) Sa and Sa' are simultaneously radiated from the light sources 141 and 144, as a first step. When the pulse beam radiations from the light sources 141 and 144 end and pulse beams Sa and Sa' fall, the first accumulating period starts. Then laser pulse beams Sb and Sb' are simultaneously emitted from the light sources 142 and 145, respectively, on condition that reflected light beams of the pulse beams Sb and Sb' are not incident on the CCD 12 during the first accumulating period. When the radiations of the light sources 142 and 145 end and the pulse beams Sb and Sb' fall, the second accumulating period starts. In the same way, laser pulse beams Sc and Sc' are simultaneously emitted from the light sources 143 and 146, respectively, on condition that reflected light beams of the pulse beams Sc and Sc' are not incident on the CCD 12 during the second accumulating period, and the third accumulating period starts just after the fall of pulse beams Sc and Sc'.

As described above, the pairs of laser pulse beams are cyclically emitted from the three pairs of the light sources 141 and 144, 142 and 145, 143 and 146 in the above described manner for one field period, and signal charges comprising the distance information are accumulated in each operation. As described in the following, light sources that are symmetrical with respect to the center of the photographing lens are paired, such as the pairs of light sources 141 and 144, 142 and 145, 143 and 146, so that a distance between luminous centers of paired light sources is made wide as possible.

Figure 10:
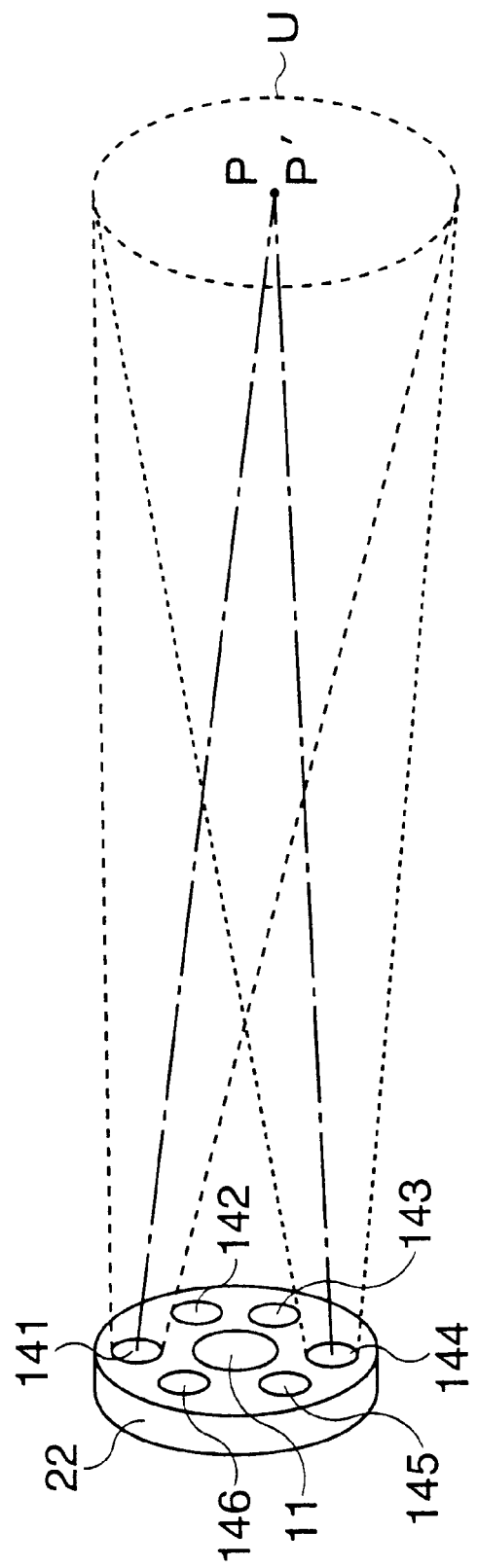
FIG. 10 illustrates an illuminating area of laser beams radiated from two different light sources.

FIG. 10 illustrates an illumination area of the pulse beams, which are simultaneously radiated from the light sources 141 and 144. The pulse beams, which are distance measuring light beams, radiated from the light sources 141 and 144 illuminate approximately the same area U at the distance of the measurement subject. Namely, centers of illuminating areas of the each distance measuring light beam, which are indicated with points P and P', are nearly identical in area U. Further, a distribution of radiance due to the each light source is approximately uniform in the illuminating area U. Thus even when radiant power of a laser beam radiated from each light source is reduced to 50 percent of the power sufficient for the distance measurement, in the illuminating area U, in which two of the distance measuring light beams overlap, a radiant power sufficient for the measurement can be obtained. Note that FIG. 10 only illustrates an example of illumination which is executed by the light sources 141 and 144, however, the illumination executed by the pairs of light sources 142 and 145, 143 and 146 are the same.

Figure 11:
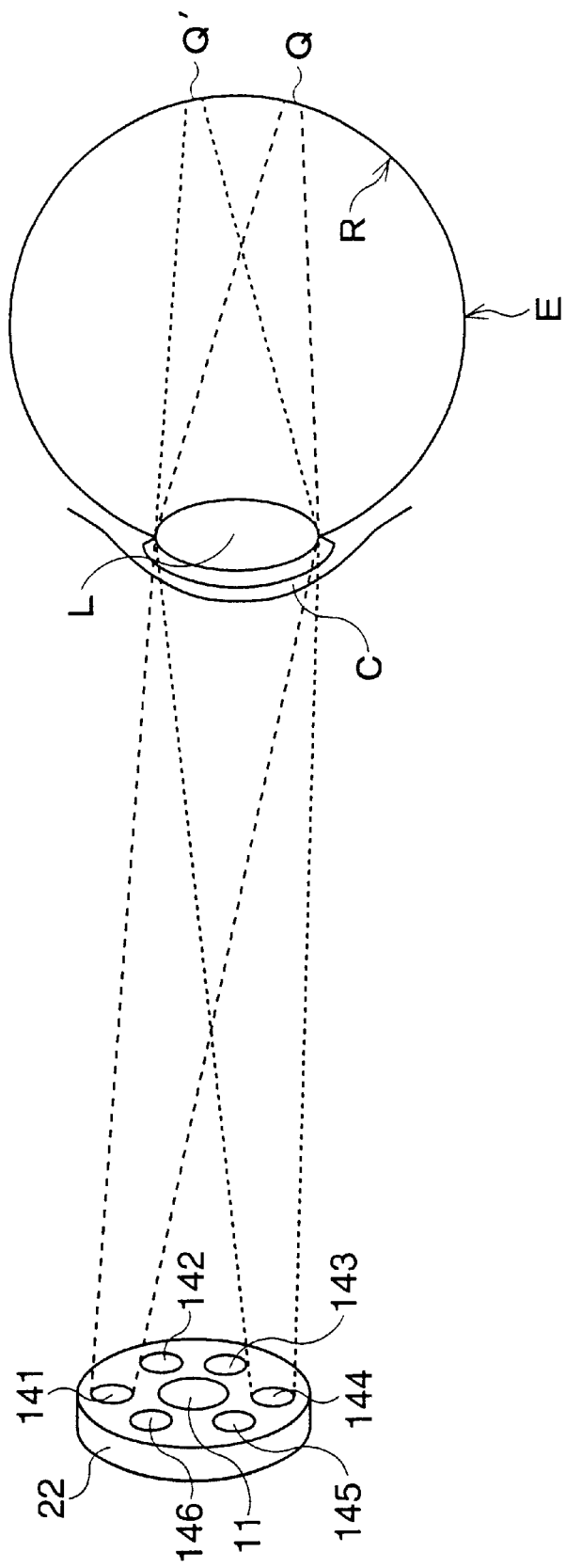
FIGS. 11 illustrates an eyeball under intrabeam viewing by the light emitting device.

In FIG. 11, a context, in which light beams emitted from the light sources 141 and 144 are incident on an eyeball, is illustrated.

In the present embodiment, a distance measuring-light beam is a laser of which wavelength is between 400 through 1400 nm and peripherally is a near-infrared laser. In this region of wavelength, only a small part of the laser beam is absorbed at a cornea C or a crystalline lens L, and most of the laser beam is incident on a retina R. Therefore a value of the maximum permissible exposure (MPE) for an eye is dependent only on the damage that may be caused on a retina R. However, the light beams emitted from the light sources 141 and 144 are diverged by illumination lens 14b so as to illuminate the entire measurement subject, human eyes unconsciously adjust the focus of a lens to the light sources. Thus, a light beam emitted from a light source and incident to an eye is concentrated on a point on a retina, which is an intrabeam viewing. Namely, a light beam emitted from the light source 141 penetrates the cornea C and the crystalline lens L and is concentrated upon the point Q which is on the retina R of the eyeball E. In the same way, a light beam emitted from the light source 144 penetrates the cornea C and the crystalline lens L and is concentrated upon the point Q' which is on the retina R.

As described above, each of the light beams emitted from the light sources 141 and 144 is concentrated on the different points Q and Q', respectively. Namely, since the radiant power of the light beams emitted from each of the light sources is reduced by half from the radiant power sufficient for the distance measurement, radiance at the points Q and Q', on which the light beams are concentrated, is reduced by nearly 50 percent. Therefore, according to the first embodiment, sufficient quantity of light for the distance measurement may be obtained while radiance at the points of the retina R (the point Q or Q' for example) on which the light beams emitted from a light source is concentrated, is reduced by half. Note that the distance between the points Q and Q' increases as the light sources 141 and 144 separate.

Figure 12:
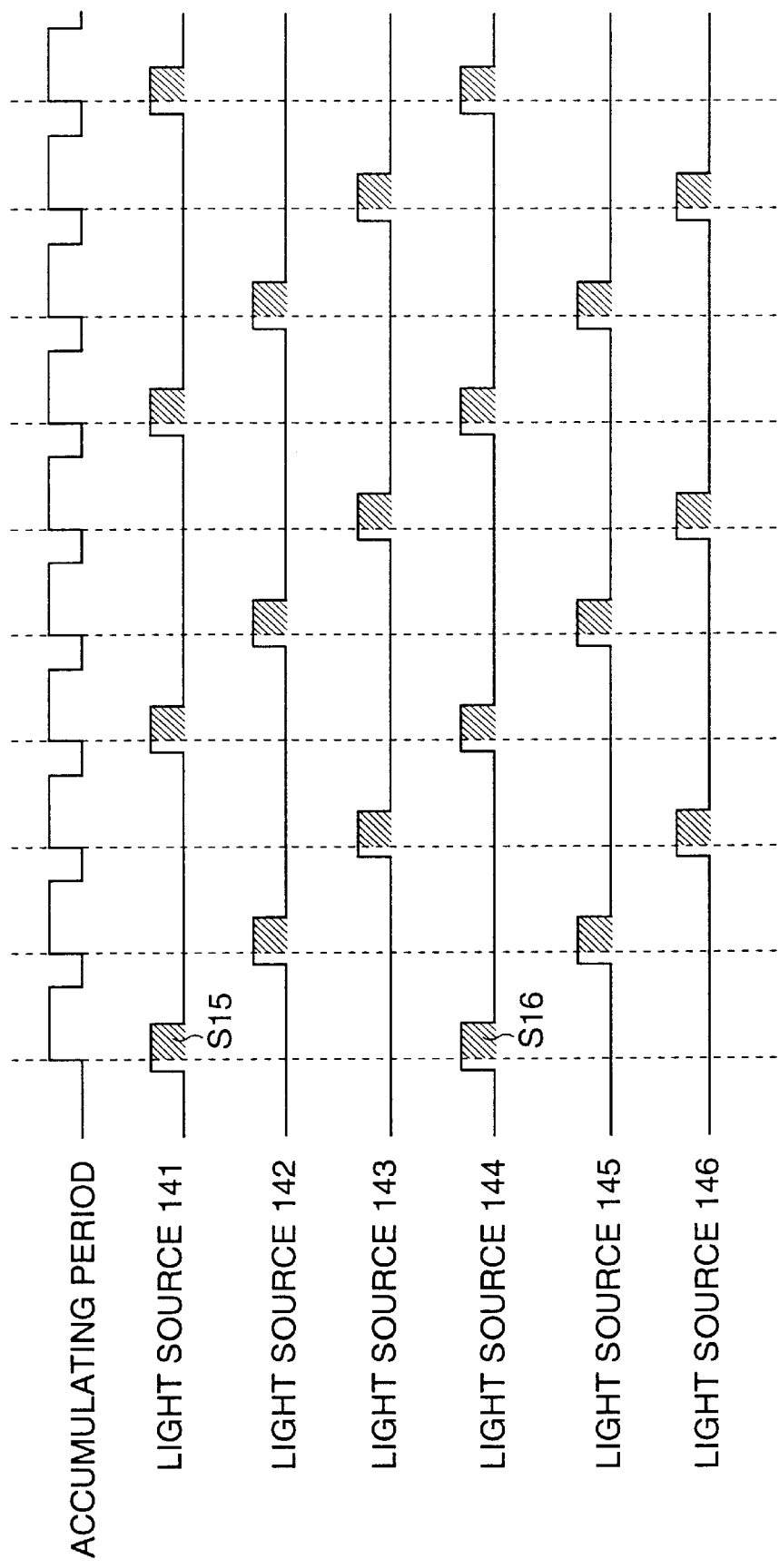
FIG. 12 is a timing chart of a signal charge accumulating operation in the first and second embodiments.

Further, in the first embodiment, the light sources are separated into three pairs, which are comprised of the light sources 141 and 144, 142 and 145 or 143 and 146, and from each pair of light sources, the distance measuring light beams are successively emitted as shown in the timing chart of FIG. 9. Namely, as the pairs of light sources radiate the light beams in sequence, light beams emitted from each pair of the light sources are concentrated upon different points on the retina, and a point on which a light beam is concentrated shifts its position as the sequence proceeds, and a time period ($T_S$) for which a laser beam is continuously concentrated on a point may be shortened. Therefore, according to the first embodiment, a quantity of light may be raised without exceeding the MPE of an eye, since integrated radiance received at the above each point may be reduced, FIG. 12 shows relations between the reflected light beam, which is received at the photo-diodes 51, and the accumulating period, when laser beams are emitted from each of the light sources at the timing shown in FIG. 9. In FIG. 12, the abscissa indicates time. A section with hatched lines indicates a portion of the reflected light beam received at the photo-diodes 51, an area of which corresponds to the signal charge accumulated in the photo-diodes 51. The radiant power of laser beams emitted from each of the light sources is approximately reduced by 50 percent of that required for the distance measurement. Consequently, signal charge accumulated in each of the photo-diode 51 due to a reflected light beam of the laser beam radiated from one light source is also reduced by half. However, since a pair of the light sources, for example light sources 141 and 144, simultaneously emits the distance measuring light beams, a total amount of the signal charge accumulated in each of the photo-diodes 51 during one accumulating period is not reduced. Namely, the total amount of the signal charge accumulated in each of the photo-diodes 51 during one accumulating period corresponds to the quantity of light indicated with portions S15 and S16, for example. Thus, the accumulated signal charge is sufficient for the distance measuring.

As described above, according to the first embodiment, integrated radiance of a laser beam that is incident on a retina of a person standing within an illuminating region of the diverged laser beam is reduced without decreasing the total quantity of light, thus eye safety may be improved while maintaining the quantity of light sufficient for the distance measurement.

Figure 13:
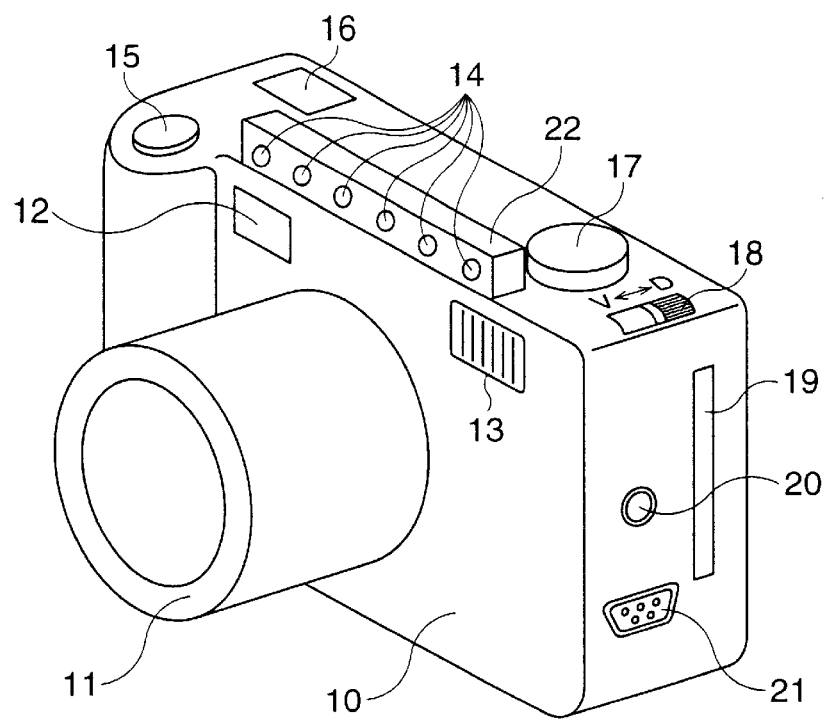
FIG. 13 is a perspective view showing a camera provided with a three-dimensional image capturing device of the second, fourth and sixth embodiments of the present invention.
Figure 14:
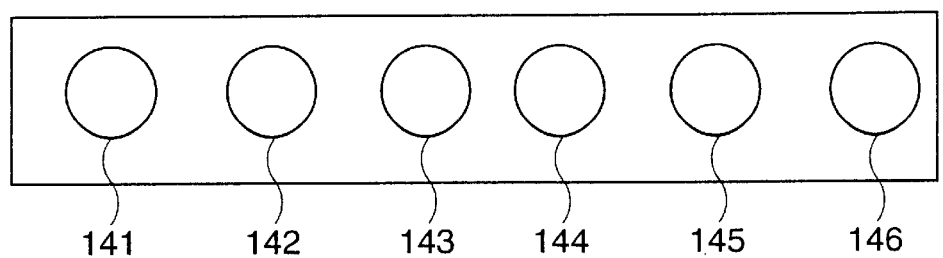
FIG. 14 illustrates a disposition of the light sources on a laser emitting device of the camera shown in FIG. 13.

Next, with reference to FIG. 13 and FIG. 14, an explanation for a second embodiment of the present invention is given.

FIG. 13 is an external view of a camera type optical reader or three-dimensional image capturing device of a second embodiment of the present invention. Only a figure and disposition of the laser emitting device 22 and an arrangement of laser device or light source 14 differ from the first embodiment. The rest of configurations are the same as the first embodiment.

In the second embodiment, the laser emitting device 22 is disposed on the upper surface of the camera body 10 and along an edge of the front surface. The laser emitting device 22 is a rectangular parallelepiped shaped with the longitudinal direction identical to the above edge. On the front side of the laser emitting device 22, there are six light sources 14 disposed at regular intervals on a line along the edge. As shown in FIG. 14, each light source is indicated with the numbers 141 through 146, respectively from the left side of the figure. In the same way as the first embodiment, the light sources 141 to 146 are separated into three pairs 141 and 144, 142 and 145, 143 and 146. Namely, each pair of light sources are arranged with two other light sources in between. The each pair of the light sources radiates a distance measuring light beam or pulse modulated laser beam in the same way described in the first embodiment. As described above, according to the second embodiment, the advantages of the first embodiment are also obtained.

Note that, in the first and second embodiments, the six light sources are separated into three pairs, and each light source in a pair simultaneously emits a light beam, however, the light sources may be separated into two groups, which comprise three light sources in each group. For example, the groups may be comprised of light sources 141, 143 and 145 and light sources 142, 144 and 146.

Further, in the first and second embodiments, each of the light sources in a pair or a group is disposed at a predetermined distance apart with a light source of an other group in between, though this is not essential. The light sources in one group may be disposed adjacently.

A third embodiment of the present invention is described below with reference to FIG. 8 and FIG. 15. Mechanical and electric structure of the third embodiment is identical with the first embodiment. However, a timing of the laser beam emission from the light sources or laser devices 141 to 146 is different from the first embodiment. FIG. 15 is a timing chart showing the relations between the accumulating period of signal charge at the photo-diodes 51 and the laser pulse beam, which is emitted from the light sources 141 through 146.

In the third embodiment, each light source successively alternately radiates a laser pulse beam around the circular arrangement. At first, the laser beam S21 is radiated from the light source 141. When the laser pulse beam radiation from the light source 141 ends and pulse beam S21 falls, the first accumulating period begins. Then laser pulse beam S22 is emitted from the light source 142 on condition of reflected light beams of the pulse beam S22 not being incident on the CCD 12 during the first accumulating period. When the radiation of the light source 142 ends and the pulse beam S22 falls, the second accumulating period starts. In the same way, laser pulse beams S23 to S26 are emitted from the light sources 143 to 146, respectively, so as not to receive reflected light beams of the pulse beams S23 to S26 during the prior accumulating period. Namely, the respective light sources 141 through 146 emit the pulse beams S21 to S26 by turns, and each of the first to the sixth accumulating periods starts just after the fall of each pulse. As described above, this laser beam emitting operation cyclically continues for one field period.

FIG. 16 is a timing chart of the accumulating periods and reflected light beams received at the photo-diodes 51, when the laser beams S21 to S26 are radiated from the light sources 141 to 146 with the timing shown in FIG. 15, and in which the abscissa represents time. A section with hatched lines indicates a portion of a reflected light beam or pulse, and corresponds to signal charge accumulated in the photo-diodes 51. Namely, signal charges accumulated in each accumulating period are represented by hatched portions of the pulse beams S31 through S36, which are the reflected light beams emitted from the each of the six light sources 141 to 146, and the signal charges comprise distance information of the measuring subject. A laser emitting operation or distance measuring light beam emitting operation by the light sources 141 to 146 and a signal charge accumulating operation are alternately repeated over one field period. The distance information of the measurement subject is calculated from one field period integrations of the signal charges, which are indicated with the hatched portions, accumulated in each accumulating period.

Each of the light sources 141 to 146 individually emits laser beams in a regular sequence as shown in FIG. 16. Therefore, an interval of the light emission in the each light source, a light emitting period, comprises six accumulating periods $T_{U1}$. A period $T_P$ in FIG. 16 indicates an interval between two succeeding accumulating periods, so that a light emitting period of each light source becomes $6 \cdot T_P$. Consequently, in the present embodiment, for each of the light sources (six laser devices) disposed on the laser emitting device, the light emitting period is six times longer than a period required in a laser emitting device in which comprises only one laser device but radiates the same quantity of light during the integration. As discussed in the first embodiment, with reference to FIG. 11, the light beams radiated from each light source concentrate upon the different points of the retina R, and a point exposed to a concentrated light beam that is incident on the retina R shifts by turns as the laser emitting operation proceeds and a current light source switches to a succeeding light source. Namely, a period of time for an incident light beam to reconcentrate onto a same point on the retina R is elongated six times of that in the operation executed by the laser emitting device with a single laser device. Therefore, radiant energy of laser beam radiated from a single light source during one field period or one light-emitting period ($6 \cdot T_P$) is reduced to ⅙ even though radiant energy of laser beam for each emission is not reduced, and the integrated radiance received at each of the points on the retina R during one field period or one light emitting period ($6 \cdot T_P$) is also reduced to ⅙. As a result, integrated radiance at each above point of the retina, on which the incident light beam is concentrated, may be maintained below the MPE of an eye and the possibility of damage caused by the light beam to the retina is significantly decreased and eye safety improves.

Further, since the six light sources sequentially emit a laser beam to a measurement subject, sufficient quantity of light for a distance measurement is obtained, even though the radiant energy of each light source during one field period or one emitting period ($6 \cdot T_P$) is reduced to ⅙.

As described above, according to the third embodiment, the same advantage as in the first and second embodiments is obtained.

Next, referring to FIG. 13 through FIG. 16, a fourth embodiment of the present invention is described.

A camera type three-dimensional image capturing device in the fourth embodiment is identical to the second embodiment as to the mechanical and electrical configuration, and a laser emitting operation is the same as the operation in the third embodiment. Namely, a perspective view of the camera is shown in FIG. 13 and disposition of the light sources or laser devices 14 is illustrated in FIG. 14. Further, timing between the accumulating period and laser pulse beam emission and between the accumulating period and reception of reflected light beams at the photo-diodes, executed in the laser emitting operation of the fourth embodiment, is described in FIG. 15 and FIG. 16. By operating the six light sources 141 through 146 in the manner described in the light emitting operation of the third embodiment, the same advantages as in the former embodiment are obtained.

With reference to FIG. 17 and FIG. 18, a fifth embodiment of the present embodiment is described.

Mechanical and electrical configurations of the fifth embodiment are the same as the first and third embodiments, so that a perspective view of a camera and disposition of the light sources in the fifth embodiment are illustrated in FIG. 1 and FIG. 8. The fifth embodiment differs from the first and third embodiments in its laser emitting operation. FIG. 17 is a timing chart that describes timing between the accumulating period and the laser beam emission executed in each of the light sources 141 to 146.

Firstly, the pulse beam S41 is emitted from the light source 141. Approximately at the same time as the pulse beam S41 falls, the pulse beam S42 is emitted from the light source 142. Then approximately concurrently with the pulse beam S42 falling, the pulse beam S43 is emitted from the light source 143. In the same manner, the pulse beams S44, S45 and S46 are successively emitted from the light sources 144, 145 and 146, respectively to the measurement subject. When the pulse beam S46 falls, a signal charge accumulation starts in the photo-diodes 51, and the accumulating operation lasts for the accumulating period $T_{U1}$.

The pulse S47 describes illuminance at a certain point on the surface of the measurement subject. The laser emitting operation for the light sources from 141 through 146 is controlled as if the pulse beams S41 through S46 compose the continuous single pulse beam S47. The distance measurement in the present embodiment is carried out with the light beam S47, which is composed of the pulse beams S41 to S46. Namely, a pulse width of the pulse beam or light beam S47 is $T_S$, and the pulse width of each of the pulse beams S41 to 546 is $T_S/6$.

FIG. 18 is a timing chart which shows the relation between the reflected light beams S51 to S56, which respectively correspond to each pulse beam S41 to S46 and are received at the photo-diodes 51, and the accumulating period $T_{U1}$. Each of the light beams S41 to S46 are reflected by the measurement subject and the corresponding reflected light beams S51 to S56 are received at the photo-diodes 51 when the period of time $T_D$ passes. Signal charge that is accumulated in the photo-diodes 51 is indicated with the respective hatched portions S58, S59 and S60 of the reflected light beams S54, S55 and S56, which are received at the photo-diodes 51 during the accumulating period $T_{U1}$. Each of the reflected light beams is received consecutively, so that the quantity of the reflected light beams received at the photo-diodes 51 are described as a single pulse S57. The hatched portions S58, S59 and S60 correspond to a hatched portion S61 of the pulse S57, and the width of the hatched portion S61 corresponds to the period $T_D$. Therefore, the quantity of light, which is indicated by the hatched portion S61, represents the distance from the camera body to the measurement subject.

The above laser emitting operation and the accumulating operation are repeatedly continued for one field period, and the signal charge accumulated in the photo-diodes 51, which corresponds to the hatched portion S61, is integrated in the vertical transfer unit 52, as described in the first embodiment. Further, the distance from the camera body to the measurement subject is calculated from the integrated signal charge.

In the present embodiment, as shown in FIG. 17, the distance measuring light beams from S41 through S46, each having a $T_S/6$ pulse width, are emitted sequentially and individually in this order from each of the six light sources 141 to 146, which are disposed in the laser emitting device 22. The reflected pulse beams S51 to S56, emitted from each of the light sources and reflected by the measurement subject, can be regarded as a single pulse beam S47 with the pulse width $T_S$. The pulse width is reduced to ⅙ of $T_S$, however, radiant power (corresponds to the pulse height) of each light beam radiated from the each light source has intensity sufficient for the distance measurement, thus the radiant energy radiated in a single emission is reduced to ⅙ of the pulse of the width $T_S$. Each laser beam incident on the retina R, which corresponds to the reflected light beams S51 to S57, is concentrated on a different point of the retina R (see FIG. 11), and the point, on which the current laser beam is concentrated, shifts its position as the laser emitting operation proceeds. Therefore, integral radiance at the point of the retina R on which the laser beams is concentrated in a single emission is reduce to ⅙ when it is compared with the laser emitting operation executed by the laser emitting device with a single laser device. Consequently, integrated radiance at each above point of the retina, on which the incident light beam is concentrated, may be maintained below the MPE of an eye and possibility of damage caused by the light beam to the retina is significantly decreased and eye safety improves. Namely, the same advantage as the preceding embodiments is obtained by the fifth embodiment.

Note that in the present embodiment, a laser pulse beam or a distance measuring light beam is described as a perfect rectangular pulse, however, an actual pulse beam is not a perfect rectangular pulse and has a substantial rise time and fall time, which are transitional periods for a rise and fall of the pulse. Therefore, a fall time of a preceding pulse beam may be overlapped with a rise time of a succeeding pulse beam, and a continuous rectangular like pulse beam is composed.

The sixth embodiment of the present invention is described below with reference to FIG. 13, FIG. 14, FIG. 17 and FIG. 18.

A camera type three-dimensional image capturing device in the sixth embodiment is identical to the second and fourth embodiments as to the mechanical and electrical configuration. A laser emitting operation in the sixth embodiment is the same as the operation in the fifth embodiment. Namely, a perspective view of the camera is shown in, FIG. 13 and disposition of the light sources or laser devices 14 is illustrated in FIG. 14. Further, timing between the accumulating period and laser pulse beam emission and between the accumulating period and reception of reflected light beams at the photo-diodes, executed in the laser emitting operation of the sixth embodiment, is described in FIG. 17 and FIG. 18. The six light sources, from 141 through 146, are operated in a manner described in the light emitting operation of the fifth embodiment. As a result, the same advantage as in the previous embodiments is obtained.

Note that, in the present embodiments, a laser beam is divergently emitted so as to illuminate the whole of the measurement subject, so that radiance of the laser beam radiated from a light source varies as a distance to the measurement subject changes. Therefore, radiant power of each light source is adjustable in order to maintain the radiance on the surface of the measurement subject to be constant.

In the present embodiments, the number of the light sources is six, however, the number of the light sources may be increased or decreased. Further, in the third through sixth embodiment, the laser emitting operation of the light sources is carried out in the order of their disposition. However, this order is not essential, and the order may be at intervals or at random.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 11-194253, 11-198516 and 11-198741 (filed on July 8, Jul. 13 and Jul. 13, 1999, respectively), which are expressly incorporated herein, by reference, in their entireties.

What is claimed is:

1. A three-dimensional image capturing device, comprising:
   a plurality of laser devices that radiate pulse modulated laser beams for a distance measurement in order to detect distance information related to a topography of a measurement subject;
   an imaging device that accumulates a signal charge corresponding to a quantity of light received at said imaging device; and
   a laser radiating control processor that controls said plurality of laser devices to radiate said pulse modulated laser beams in a predetermined order, each laser device of said plurality of laser devices being disposed at predetermined intervals, each illuminating area of said laser beam radiated from said each laser beam overlapping each other at the distance of said measurement subject, said laser radiating control processor controlling said plurality of laser devices to radiate said laser beams in a predetermined order consecutively, so that consecutive said laser beams compose a single pulse beam for said distance measurement.

2. The device of claim 1, wherein said single pulse beam comprises a rectangular pulse.

3. The device of claim 1, wherein said plurality of laser devices are disposed at regular intervals along a periphery of a photographing lens in a circular arrangement.

4. The device of claim 3, wherein said laser radiating control processor controls each of said laser devices, so that said laser beams are radiated from each of said laser devices successively around said circular arrangement.

5. The device of claim 1, wherein said plurality of laser devices are arranged at regular intervals along a line in a predetermined direction.

6. The device of claim 5, wherein each of said laser devices repeatedly radiates said laser beams successively along said line.

7. The device of claim 1, wherein said imaging device receives a reflected light beam of said single pulse beam, and detects said distance information, which relates to said measurement subject, from signal charge accumulated in said imaging device, due to said single pulse beam, during a predetermined period.

8. The device of claim 7, wherein said laser radiating control processor is driven repeatedly and said imaging device respectively accumulates said signal charge in each of said predetermined periods that corresponds to each of said single pulse beams.

9. The device of claim 8, wherein said imaging, device comprises:
   a plurality of photoelectric conversion elements that accumulate said signal charge in each of said photoelectric conversion elements;
   a signal charge holding unit disposed adjacent to each of said photoelectric conversion elements; and
   wherein said signal charge accumulated in each of said photoelectric conversion elements is transferred to each of corresponding said signal charge holding units for each of said predetermined periods.

* * * * *